United States Patent [19]

Hendzel

[11] Patent Number: 5,181,543
[45] Date of Patent: Jan. 26, 1993

[54] TUBE TESTING CONNECTOR

[75] Inventor: Adam J. Hendzel, Brookfield, Ill.

[73] Assignee: Tuthill Corporation, Hinsdale, Ill.

[21] Appl. No.: 748,532

[22] Filed: Aug. 22, 1991

[51] Int. Cl.⁵ .................. F16L 55/10; G01M 3/14
[52] U.S. Cl. .................. 138/90; 138/89; 73/49.8
[58] Field of Search .............. 138/89, 90; 73/49.1, 73/49.5, 49.8; 220/235, 237, 238; 411/55, 44, 57, 63-68

[56] References Cited

U.S. PATENT DOCUMENTS

| | | | |
|---|---|---|---|
| 739,589 | 9/1903 | Clifford | 138/90 |
| 1,466,450 | 8/1923 | Kothe | 138/90 |
| 2,757,740 | 8/1956 | Bohannan et al. | 138/90 |
| 3,542,076 | 11/1970 | Richardson | |
| 3,727,952 | 4/1973 | Richardson | |
| 3,738,688 | 6/1973 | Racine | |
| 3,779,587 | 12/1973 | Racine | |
| 4,602,500 | 7/1986 | Kelly | 138/90 |

Primary Examiner—James E. Bryant, III
Attorney, Agent, or Firm—Lee, Mann, Smith, McWilliams, Sweeney & Ohlson

[57] ABSTRACT

A tube testing connector having a body member with an axial bore therethrough and a stem slidably disposed within said bore for internal sealing of open ended thin wall deformable tubing which employs a wide elastomer seal which provides for a more liquid tight seal. A relief groove is provided at the rear end of the stem which allows pressure within the connector to be vented rearwardly as the relief groove moves axially beyond an O-ring from a sealing position to a non-sealing position allowing venting of the tube prior to removal.

8 Claims, 1 Drawing Sheet

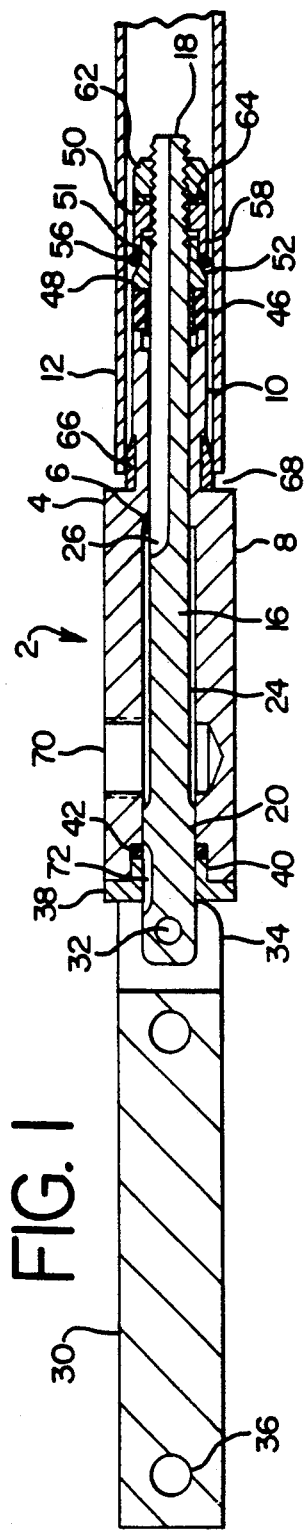
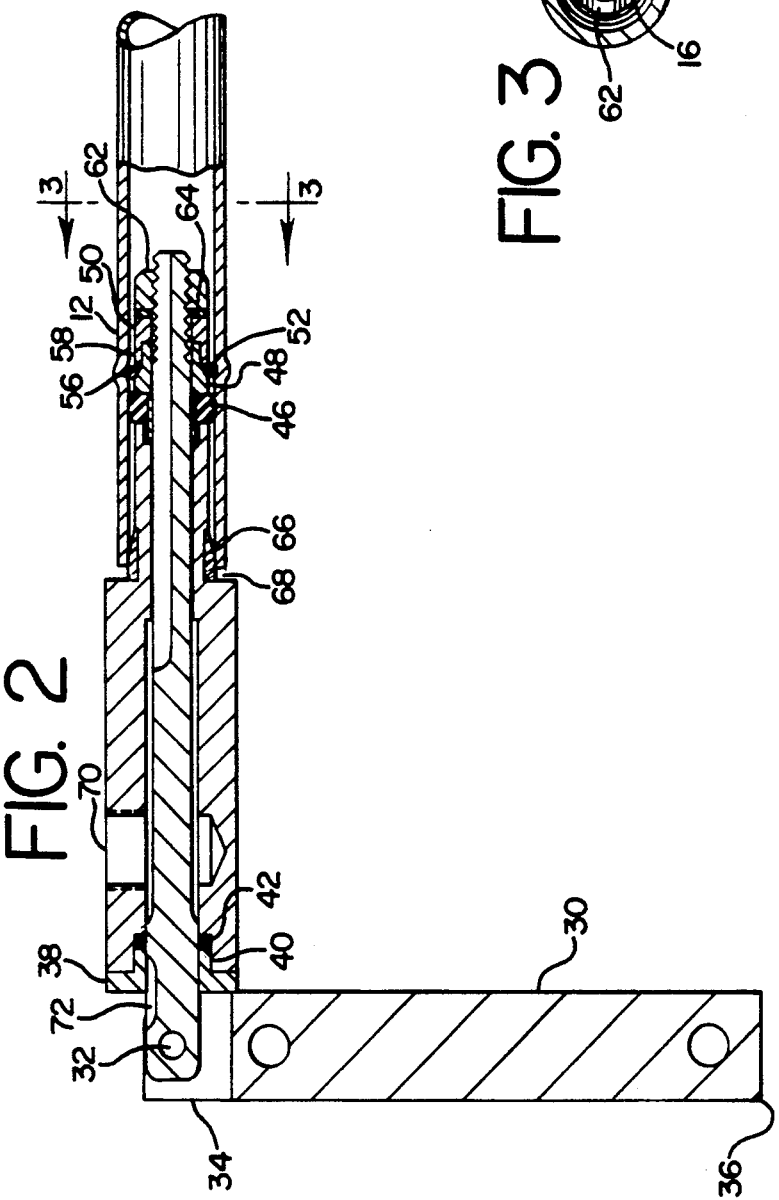
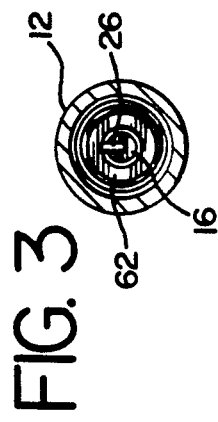

TUBE TESTING CONNECTOR

BACKGROUND OF THE INVENTION

This invention relates to connectors for temporarily sealing the end of tubes and conduits and pressurizing the tubes for testing to be sure that the tubing does not leak. Recently, to increase the surface area of copper tubing used in the refrigeration industry, a "Rifle ID" feature has been included. This feature involves a knurling operation which is performed on the inner diameter of the tubing. Problems have been encountered with the sealing devices used when pressure testing the components that utilize this copper tubing. Previous devices have utilized an O-ring seal which provides inadequate sealing at high pressures and minimal seal life, due to the high internal pressure and the grooved inner diameter. Sealing on the outer diameter of the copper tubing has provided unsatisfactory results because the OD of the tube is not controlled to a sufficient tolerance to allow for consistent sealing.

SUMMARY OF THE INVENTION

The tube testing connector of the present invention provides a wide elastomer seal which results in more sealing area, thereby increasing the effectiveness of the seal between the connector and the tube being tested. A relief groove is provided in the tube connector which provides an exhaust passage for pressurized gas within the tubing prior to removal of the tube testing connector. This allows for removal of the tube connector after the system is depressurized, thus extending the life of the seal.

BRIEF DESCRIPTION OF THE DRAWINGS

FIG. 1 is a side view in cross-section showing the tube testing connector embodying the features of the invention in the non-sealing position;

FIG. 2 is a side view in partial cross-section of the tube testing connector in the actuated or sealed position; and FIG. 3 is a partial end view of the tube testing connector taken along line 3—3 in FIG. 2.

DETAILED DESCRIPTION OF THE PREFERRED EMBODIMENT

The present invention is directed to a tube testing connector 2 which provides for a more satisfactory seal when pressure testing thin wall deformable tubing having a "Rifle ID" feature, and provides for an extended seal life. Generally, as shown in FIG. 1, the tube testing connector 2 has a body 4 which includes an axial bore 6 extending throughout its entire length. The body 4 has a shoulder portion 8 and a terminal portion 10. The terminal portion 10 is adapted for insertion into a tube 12. The bore 6 is enlarged at the shoulder portion 8 of the body 4 and its function will hereinafter become apparent. A stem 16 is shiftably disposed within the bore 6 between the unsealed position illustrated in FIG. 1 and the sealed position illustrated in FIG. 2. The stem 16 includes a threaded first end 18 and an enlarged second end 20 which projects beyond the shoulder portion 8 of body 4. The stem 16 is in close tolerance relationship with the bore 6 at the terminal portion 10 of the body 4. A passage means 24 is formed between the bore 6 and the stem 16, at the shoulder portion 8 of the body 4. The stem 16 is provided with a longitudinal groove or channelway 26 which extends substantially from a point immediately below a portion of the passage means 24 to the threaded first end 18 of the stem 16 as seen in FIG. 3. The channelway 26 provides a passage for pressurized gas to flow into the tubing.

A handle 30 is pivotally attached to the enlarged second end 20 of the stem 16 by a pin 32. The handle 30 has a first end 34 and a second end 36. A cam washer 38 is disposed between the first end 34 of the handle 30 and the shoulder portion 8 of the body 4, which provides a camming surface for handle 30 when it is pivoted through an arc of 90° as will hereinafter become apparent. A counterbore 40 is defined in the left end of body 4 adjacent the cam washer 38 in communication with bore 6. A sealing member such as an O-ring 42 is disposed in the counter bore 40 to seal the left end of bore 6 adjacent the enlarged second end 20 of the stem 16 in fluid tight relationship.

A wide elastomer seal 46, an actuating ring 48 and a spacer member 50 are disposed about the first end 18 of the stem 16. The elastomer seal 46 has a wall thickness to length ratio of approximately 1 to 3. The seal 46 is preferably made from chloroprene rubber which is sold under the trade name "Neoprene" by E. I. du Pont although other elastomers may be substituted if they are compatible with the test fluid and other test conditions. Seals which have been utilized effectively have the following sizes: (a) 0.35" OD×0.22" ID×0.19" long, and (b) 0.29" OD×0.16" ID×0.19" long. The ring 48 and the spacer 50 encircle the stem 16 and move with it. The elastomer seal 46 abuts the terminal portion 10 of the body 4. The actuating ring 48 has a narrow end 51 and an inclined surface 52. A retaining ring 56 is disposed on the inclined surface 52 of the actuating ring 48 between the elastomer seal 46 and the spacer member 50. The spacer member 50 has a projecting portion 58 which provide the means whereby the retaining ring 56 is urged up the inclined surface 52 of the actuating ring 48 into an anchoring or locking position. A stop nut 62 and washer 64 are secured to the threaded first end 18 of the stem 16 so as to retain the elastomer seal 46, actuating ring 48, retaining ring 56 and spacer member 50 in the relative positions shown in FIG. 1.

A resilient stop member 66 is located on the outer periphery of the terminal portion 10 of the body 4 adjacent the shoulder portion 8. Upon insertion of the connector 2 into a tube 12, the stop member 66 engages the inner periphery of the end of tube 12 and forms a gap 68, between the tube 12 and the shoulder portion 8 of the body 4 thereby preventing the tube 12 from abutting the shoulder portion 8 of the body 4 and being damaged.

A fluid inlet port 70 is located in the shoulder portion 8 of the body 4, and is in communication with the passage 24. This inlet port 70 is adapted to receive pressurized fluid from a pressure source (not shown). A pressure releif groove 72 is formed in the stem 16 at the second end 20 to provide for venting of the pressurized gas.

In operation, the tube testing connector 2 is inserted into a tube 12 for testing with the handle 30 in the unlocked, unsealed position as shown in FIG. 1. Once fully inserted so that the tube end firmly engages the stop member 66, the handle 30 is rotated counterclockwise through an arc of 90° to a locked and sealed position as shown in FIG. 2. When the handle 30 is rotated, the stem 16 is pulled to the left, as viewed in FIG. 2, thereby moving the actuating ring 48 to the left, causing the compression of the elastomer seal 46 thereby increasing its outer diameter and forcing the same into sealing engagement with the internal wall of the tube 12 to form a tight seal. At the same time, the spacer member 50 is also moved to the left and the projecting portion 58 acts upon the retaining ring 56 to drive it up the inclined surface 52 of the actuating ring 48. This causes the retaining ring 56 to also engage the internal wall of the deformable tube 12 to form an internal groove and an external bead to anchor the tube testing connector 2 securely in place within the tube 12. In the unsealed position of FIG. 1, the relief groove 72 has portions lying on either side of the seal 42. In the sealed position of FIG. 2, the relief groove 72 is shifted entirely to the left of the O-ring 42 which seals against the escape of gas. Thus, a pressure tight seal is formed at the end of the tube 12 where the tube testing connector 2 is attached. Normally a pressurized gas is used for testing the tubing but other pressurized fluid including pressurized liquids can also be used.

Pressurized fluid is introduced into the connector via the inlet port 70. The fluid flows through the passage 24, through the longitudinal groove 26 in the stem 16 and into the tube 12 to be pressure tested.

When the test has been completed, the opposite sequence of steps is followed. As the handle 30 is returned to its non-sealing position of FIG. 1, a portion of the relief groove 72 passes the O-ring 42 as shown in FIG. 1 and provides for a release of the pressure which has built up inside the tube 12. The elastomer seal 46, actuating ring 48, retaining ring 56 and spacer member 50 return to the non-sealing position shown in FIG. 1. This thereby allows for an easier removal of the tube testing connector 2 and less wear on the O-ring 42 and elastomer seal 46.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed:

1. A tube testing device for insertion into open ended tubing for sealing one end thereof, said device including a body member having an axial bore and a terminal portion adapted to be inserted into the open end of a tube; a stem shiftably disposed in said bore, said stem having a first end adapted to enter the tube and a second opposite end adapted to remain out of the tube; handle means secured to said stem to move said stem between a first non-sealing position and a second sealing position; a first seal member mounted adjacent said terminal portion of said body member, said first seal member being made of a compressible resilient material to increase its outer diameter when compressed laterally so as to engage the inner periphery of the tube and seal against the escape of pressurized fluid; actuating means connected to said stem and engageable against said first seal member such that when said stem moves from said non-sealing position to said sealing position said actuating means laterally compresses said first seal member so as to increase its outer diameter to effect sealing engagement with the tube; a port defined in said body member adapted to communicate pressurized fluid from a pressure source to said axial bore; a second seal member surrounding said stem toward said second end thereof to seal against the escape of pressurized fluid from said bore when said stem is in said sealing position; and a pressure relief groove formed in said stem toward said second end, said groove positioned such that when said stem moves from said sealing position to said non-sealing position, portions of said groove lie on either side of said second seal member thereby providing an exhaust passage for pressurized fluid from said axial bore, prior to removal of the tube being tested.

2. A tube testing device as in claim 1 wherein said first seal member has a wall thickness to length ratio of approximately 1 to 3.

3. A tube testing device as in claim 1 wherein said actuating means includes an actuating ring disposed on said first end of said stem.

4. A tube testing device as in claim 3 wherein said actuating ring has a narrow end and sloping sides.

5. A tube testing device as in claim 4 including a spacer member disposed adjacent said actuating ring.

6. A tube testing device as in claim 5 wherein a retaining ring is disposed between said first seal member and said spacer member on said actuating ring at said narrow end such that when said stem moves from said non-sealing position to said sealing position said retaining ring is pushed up said sloping sides of said actuating ring by said spacer member and engages said inner periphery of the tube to secure the device in the tube.

7. A tube testing device as in claim 1 including a resilient stop carried by said terminal portion of said body member on the outer periphery thereof said stop adapted to engage an end of the tube to be tested.

8. A tube testing device as in claim 1 in which said first seal member overlies and encircles said stem and is positioned between an end of said terminal portion and said actuating means for compression therebetween.

* * * * *